United States Patent [19]

Cote

[11] Patent Number: 4,861,065
[45] Date of Patent: Aug. 29, 1989

[54] SUSPENSION SYSTEM FOR A BOGIE VEHICLE

[75] Inventor: Jean-Marie Cote, Pierrefonds, Canada

[73] Assignee: Forest Engineering Research Institute of Canada, Pointe Claire, Canada

[21] Appl. No.: 202,012

[22] Filed: Jun. 3, 1988

[30] Foreign Application Priority Data

Jun. 10, 1987 [CA] Canada .................................. 539382

[51] Int. Cl.[4] .............................................. B60G 9/00
[52] U.S. Cl. .................................. 280/678; 180/24.02; 280/6.12
[58] Field of Search .............. 180/24.02, 41; 280/6 R, 280/707, 6 H, 678, 104, 840

[56] References Cited

U.S. PATENT DOCUMENTS

| | | | |
|---|---|---|---|
| 3,366,399 | 1/1968 | Hunger | 280/678 |
| 3,507,512 | 4/1970 | McKee et al. | 280/678 |
| 3,522,956 | 8/1970 | Saver et al. | 280/678 |
| 3,970,325 | 7/1976 | Dezelan | 280/6 H |
| 4,136,893 | 1/1979 | Sweet et al. | 280/678 |
| 4,202,564 | 5/1980 | Straner | 280/678 |
| 4,371,182 | 2/1983 | Brown | 280/6 H |
| 4,606,551 | 8/1986 | Toti et al. | 280/6.11 |
| 4,687,222 | 8/1987 | Chalmers | 280/678 |

Primary Examiner—Richard A. Bertsch
Attorney, Agent, or Firm—Charles E. Brown; Charles A. Brown

[57] ABSTRACT

A vehicle with an improved suspension system having a chassis with a bogie on each side of the chassis. The vehicle has a hydraulic system that includes actuator means connected between each bogie and the chassis for maintaining the chassis generally level on level ground. The hydraulic system includes first and second connecting systems extending between the two actuator means in a manner to have movement of one wheel in one bogie in one direction tend to cause movement of the corresponding wheel in the other bogie in the opposite vertical direction to the one direction to minimize tilting of the chassis. The improved suspension system also includes a second hydraulic system that can be selectively connected to one of the first and second connecting systems to tilt the chassis relative to the bogies in one direction or the other so as to generally maintain the chassis level on ground that slopes in the longitudinal direction of the vehicle.

11 Claims, 4 Drawing Sheets

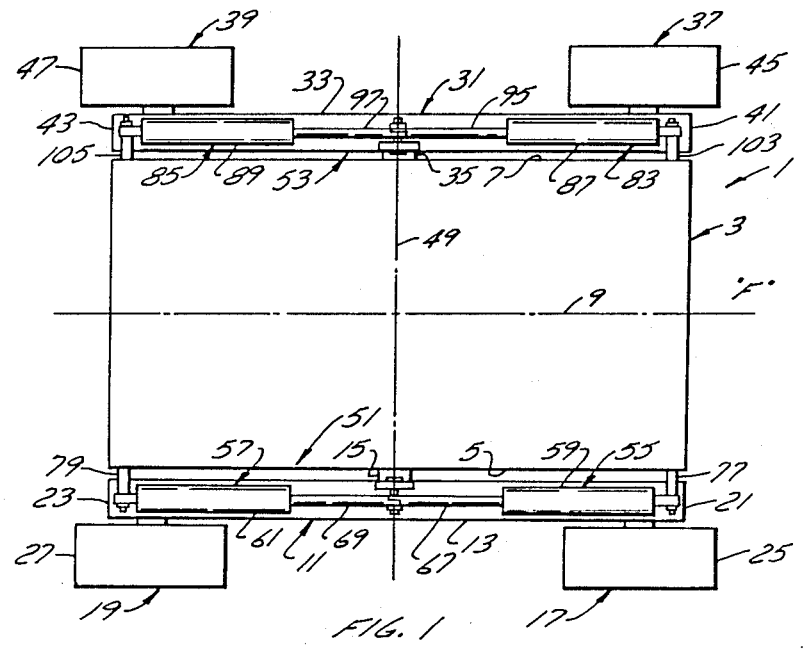
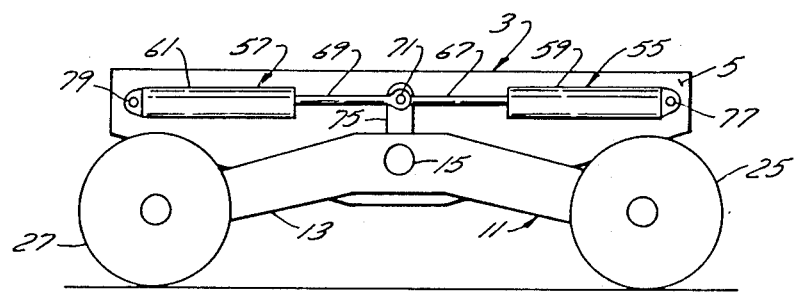

SUSPENSION SYSTEM FOR A BOGIE VEHICLE

BACKGROUND OF THE INVENTION

1. Field of the Invention

This invention is directed toward a vehicle with an improved suspension system.

The invention is more particularly directed toward a vehicle with an improved suspension system which incorporates two bogies.

2. Description of the Prior Art

Vehicles with a suspension system incorporating bogies on each side of the vehicle are well known. A bogie normally comprises a walking beam with a wheel at each end. The walking beam is pivotally mounted to the side of the vehicle chassis at about the longitudinal center of the beam. Bogies provide vehicles which are more suited for travel over rough and uneven ground since the pivoted walking beams of the bogies, on each side of the vehicle, allow the wheels mounted at the ends of the walking beams to have more vertical movement than if the wheels were mounted on axles traversing the chassis. Vehicles equipped with bogies thus provide a better ride on rough ground and are less liable to tip.

Known bogie-equipped vehicles usually have running gear arrangements that provide stability for the vehicle. A vehicle equipped with only a single bogie on each side is normally inherently unstable since the chassis is free to pivot relative to the walking beams. Thus bogie-equipped vehicles usually have at least two bogies on each side of the vehicle to provide stability, or one bogie is combined with at least one longitudinally spaced wheel or other type of running gear on each side of the vehicle, to provide stability.

Vehicles with a single bogie on each side of the vehicle are known. However, to provide stability to such vehicles, it is necessary to provide a mechanical cross-connection between the walking beams on the sides of the vehicle and the chassis. More particularly, a cross-beam is pivotally mounted at about its center to the chassis of the vehicle. The cross-beam is pivotally mounted to the chassis at about the longitudinal axis of the vehicle at the front or rear of the vehicle. The ends of the cross-beam are connected to the same ends of the two walking beams on the sides of the vehicle. The cross-beam arrangement prevents the chassis from uncontrollably tilting relative to the walking beams. The cross-beam arrangement also helps to stabilize the vehicle during operation. When one wheel at one end of a walking beam on one side of the vehicle passes over a bump, the one end of the walking beam is raised while the cross-beam tends to cause the corresponding end, and thus the wheel at that end, of the walking beam on the other side of the vehicle, to be automatically lowered. By the term "corresponding" end, it is meant the front end of the other walking beam if the one end of the one walking beam is the front end, or it is meant the rear end of the other walking beam if the one end of the one walking beam is the rear end. Of course, if the wheel on the corresponding end of the walking beam on the other side is already in contact with the ground, it is the chassis that is raised, due to its connection with the cross-beam. The raising of the chassis minimizes tilting of the vehicle, thus stabilizing its ride. At the same time, the cross-beam arrangement ensures good ground contact of all the wheels of the vehicle having two bogies, even when traversing very rough or uneven ground. An example of a two-bogie vehicle employing a mechanical cross-connection is shown in U.S. Pat. No. 3,313,555.

It is also known to have vehicles with a single bogie on one side of the vehicle. An example of such a vehicle is shown in U.S. Pat. No. 4,639,186. In this type of vehicle, two longitudinally spaced-apart wheels on the other side of the vehicle are fixed to the chassis. The vehicle thus always has at least three point ground contact and is stable. This type of vehicle has one side, the bogie side, which can more easily traverse rough ground while the vehicle is steered to have the other side, with the fixed wheels, pass over smoother ground.

The above known vehicles with a single bogie on one or both sides of the chassis, while providing a better ride over rough ground, have disadvantages. Those vehicles that employ a mechanical cross-beam to stabilize the vehicle, as shown in U.S. Pat. No. 3,313,555, have the cross-beam located in an unprotected area at the front or back of the vehicle. The cross-beam is thus in a position to be easily damaged when the vehicle is operated in a close-quarters environment such as when tree harvesting. Other vehicles, which employ a single bogie on one side, as shown in U.S. Pat. No. 4,639,186, do not provide as good a ride over rough, uneven ground as do vehicles with two movable bogies. Further, none of the above known vehicles, with a single bogie on one or both sides, have means for leveling the vehicle when it is in certain positions on sloping ground. If it is desired to have these vehicles leveled on sloping ground, separate leveling means would have to be added to the vehicle.

SUMMARY OF THE INVENTION

It is the purpose of the present invention to provide an improved suspension system for a vehicle that has a single bogie on each side of the vehicle. The improved suspension system is one which is less likely to be damaged during heavy, rough usage of the vehicle. The improved suspension system maintains the vehicle generally level on level ground and provides better stability to the vehicle, particularly when traveling over rough terrain. The improved suspension system also provides means to level the vehicle when working on sloping ground. The improved suspension system also provides a smoother ride by dampening out shocks and bumps.

The improved suspension system has a first hydraulic system which employs actuator means connected between each of the two walking beams of the two bogies on the vehicle and its chassis. First and second connecting systems, employing hydraulic lines, hydraulically connect the actuator means on both sides of the vehicle together. The improved suspension system also has a second hydraulic system with a third connecting system, employing valve means and hydraulic lines to selectively connect a source of hydraulic fluid to the first hydraulic system.

The improved suspension system is normally set-up in a first operating condition to have the actuator means maintain the chassis of the vehicle generally level on level ground. In this first operating condition, only the first hydraulic system is operational while the second hydraulic system is disconnected from the first hydraulic system. In the first operating condition of the suspension system, the actuator means on each side of the vehicle are hydraulically connected to each other in a manner to have vertical movement of one wheel on one walking beam in one direction, as when passing over a bump, automatically tend to cause movement of the corresponding wheel on the other walking beam in the opposite vertical direction. Since, however, the corresponding wheel is usually already in contact with the ground, and cannot move in the opposite vertical direction, the actuator means cause the chassis instead to move up relative to the walking beam carrying the corresponding wheel. This upward movement of the chassis on the opposite side of the bump minimizes tilting of the chassis when passing over a bump and also improves traction.

The improved suspension system can also be set up in a second operating condition to have the actuator means level the chassis when the vehicle is operating on a slope with its longitudinal axis generally aligned with the slope. In the second operating condition, the second hydraulic system is connected to the first hydraulic system in a manner to supply hydraulic fluid to the actuator means on both sides of the chassis to tilt the chassis relative to the walking beams to level the chassis. The leveling of the vehicle in the second operating condition of the hydraulic system is carried out under manual control although it could also be carried out automatically in conjunction with using a level sensor.

Each actuator means of the improved suspension system preferably employs two hydraulic rams connected between each walking beam and the chassis. One hydraulic ram is connected between the walking beam and the chassis on one side of the pivot connection of the walking beam to the chassis, and the other hydraulic ram is connected between the walking beam and the chassis on the other side of the pivot connection. The one hydraulic ram is normally associated with the front wheel of the walking beam and the other hydraulic ram is associated with the rear wheel.

The two hydraulic rams of each actuator means are preferably aligned and horizontal when the vehicle is on level ground. The two rams on each side of the vehicle are pivotally connected at one end at a common point to a lever fixed to the center of the walking beam. The other ends of the rams are pivotally connected to the chassis. All the rams are of the same size and thus the rams balance each other when in the first operating condition to keep the chassis level.

Each hydraulic ram has a cylinder with a piston in the cylinder dividing the space within the cylinder into two working chambers. In the first operating condition, the piston in each cylinder of all four hydraulic rams is generally centrally located in the cylinder and all the working chambers and the first and second connecting systems are filled with hydraulic fluid. Normally the four hydraulic rams are balanced to maintain the chassis level on level ground. The first and second connecting systems automatically connect the working chambers of the rams on both sides of the vehicle together in a manner such that when one wheel on one side of the vehicle passes over a bump, causing its associated ram to expel fluid from one chamber, this expelled fluid moves to the other chamber in the ram associated with the corresponding wheel on the other side of the vehicle tending to cause this wheel to move in the opposite direction. However, this wheel normally cannot move in the opposite direction since it is already in contact with the ground. Instead, the ram causes the chassis to be raised thereby minimizing tilting of the chassis due to the one wheel passing over the bump. The other two corresponding wheels on the vehicle are, of course, simultaneously tending to move in the opposite direction to the one wheels due to the automatic transference of fluid between the working chambers in their associated rams by the first and second hydraulic connecting systems to further help minimize chassis tilting.

In the second operating condition, the second hydraulic system is connected to the first hydraulic system in a manner to conduct hydraulic fluid from the fluid source, via the third connecting system and one of the first and second connecting systems simultaneously to the same working chambers of corresponding rams on the two sides of the vehicle. This causes the chassis to tilt in a fore and aft direction relative to the walking beams, in one direction or the other. The fluid simultaneously expelled from the opposite working chambers of the rams is directed back to the fluid source via the other of the first and second connecting systems and the third connecting system. The valve means in the third connecting system selectively connects the second hydraulic system to the first hydraulic system and also selectively controls the direction of tilt.

The invention is particularly directed toward a vehicle with an improved suspension system having: a chassis; a first bogie on one side of the vehicle; and a second bogie on the other side of the vehicle. Each bogie consists of a walking beam, pivot means pivotally mounting the walking beam at about its longitudinal center to a side of the chassis at about the longitudinal location of the vehicle's center of gravity, and at least one wheel at each end of the beam. The suspension system has a hydraulic system having actuator means connected between each walking beam and the chassis for generally maintaining the chassis level on level ground. The hydraulic system has first and second connecting systems extending between the two actuator means in a manner to have movement of one wheel in one bogie in one direction, when passing over uneven ground, simultaneously and automatically tend to move the corresponding wheel in the other bogie in the opposite direction to the one direction to minimize tilting of the chassis and to stabilize the vehicle.

The suspension system of the vehicle includes a second hydraulic system having valve means, a fluid source and a third connecting system. The valve means selectively connects the fluid source to the actuator means via the third connecting system and one of the first and second connecting systems to tilt the chassis relative to the walking beams about the pivot means in one direction or the other so as to maintain the chassis generally level on ground that slopes in the longitudinal direction of the vehicle.

Each actuator means preferably comprises a pair of hydraulic rams positioned generally horizontal on the vehicle and aligned with each other with one end of each ram attached to the chassis and with the other end attached to the walking beam.

BRIEF DESCRIPTION OF THE DRAWINGS

The invention will now be described in detail having reference to the accompanying drawings in which:

FIG. 1 is a plan view of the vehicle;

FIG. 2 is a side view of the vehicle in a normal level position;

DESCRIPTION OF THE PREFERRED EMBODIMENTS

Figure 3:
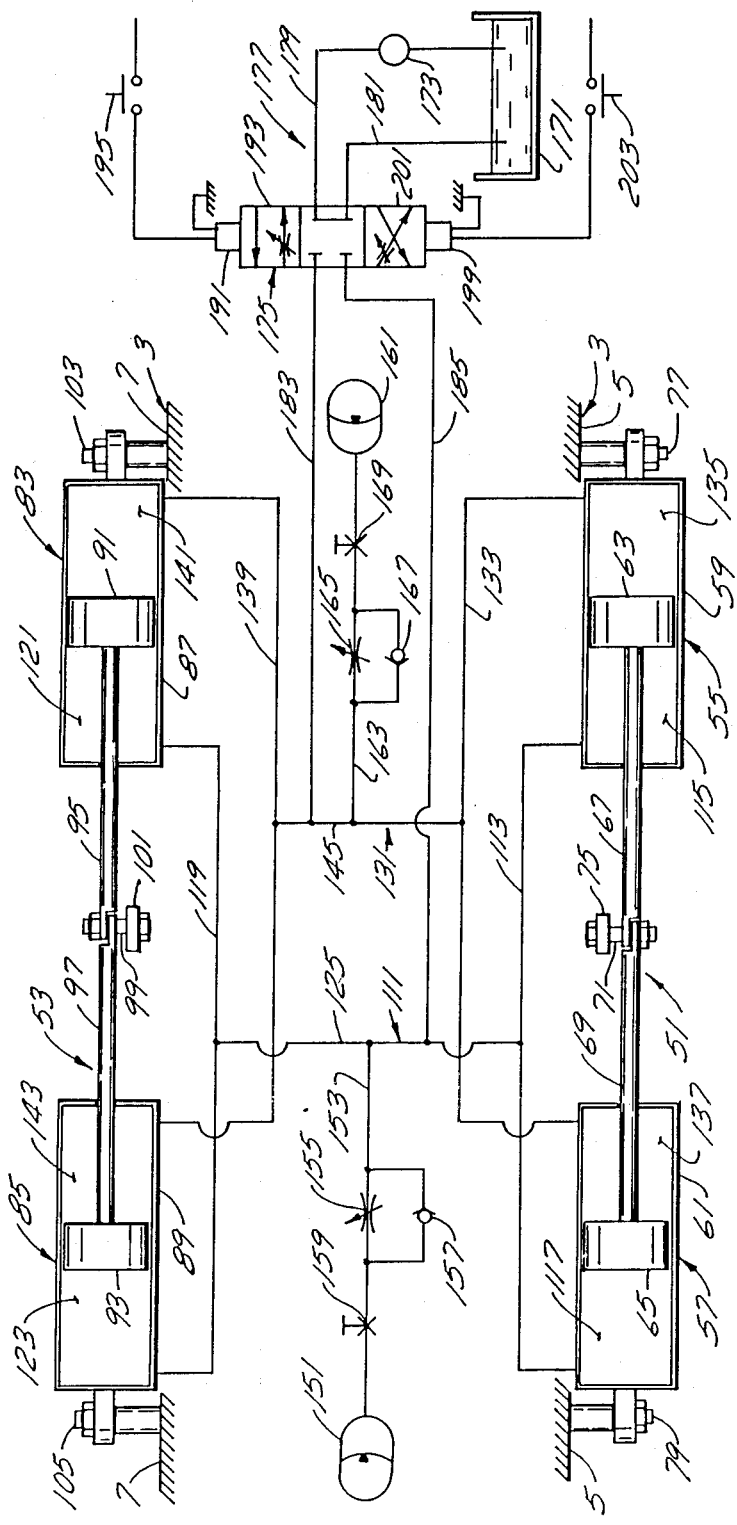
FIG. 3 is a schematic view of the fluid operating system.

The vehicle 1 of the present invention, as shown in FIGS. 1 and 2, has a chassis 3 with left and right sides 5, 7, as viewed from the front "F" of the vehicle, parallel to the longitudinal axis 9 of the vehicle. The suspension system of the vehicle has a first bogie 11 mounted on the left side 5 of the chassis 3. The first bogie 11 has a first walking beam 13 pivotally mounted at about its longitudinal center with a horizontal pivot 15 to the side 5 of the chassis 3. First and second ground engaging means 17, 19 are mounted at the ends 21, 23 respectively of the first walking beam 13. The first and second ground engaging means 17, 19 preferably each comprise at least one wheel 25, 27. The left wheels 25, 27 are preferably each driven to drive the vehicle. A second bogie 31 is mounted on the other right side 7 of the chassis 3. A second bogie 31 has a second walking beam 33 pivotally mounted at about its longitudinal center with a horizontal pivot 35 to the side 7 of the chassis. Third and fourth ground engaging means 37, 39 are mounted near the ends 41, 43 of the second walking beam 33. The third and fourth ground engaging means 37, 39 also preferably comprise at least one wheel 45, 47. The right wheels 45, 47 are also driven to drive the vehicle. The horizontal pivots 15, 35 are aligned along an axis 49 that is transverse to the longitudinal axis 9 of the vehicle. The center of gravity of the vehicle is located in, or close to, a vertical plane containing transverse axis 49.

The vehicle suspension system includes a fluid system connected between the walking beams 13, 33 and the chassis 3. The fluid system is preferably a hydraulic system and has first and second actuator means 51, 53 connected between the first and second bogies 11, 31 and the chassis 3 respectively. The first actuator means 51, as shown in FIG. 3, comprises first and second hydraulic rams 55, 57. Each hydraulic ram 55, 57 has a cylinder 59, 61; a piston 63, 65 within the respective cylinders 59, 61; and a piston rod 67, 69 extending out of one end of the respective cylinders 59, 61 from the respective pistons 63, 65. The first and second rams 55, 57 are mounted on the side 5 of the chassis 3 in a generally horizontal, aligned manner. the free ends of their piston rods 67, 69 are pivotally connected with a pivot 71 to the free end of an upwardly extending, centrally located, lever 75 on the first walking beam 13 (see FIG. 2). The first ram 55 is also pivotally connected, via the other end of its cylinder 59, to the side 5 of the chassis 3 with a pivot 77. The second ram 57 is also pivotally connected, via the other end of its cylinder 61, to the side 5 of the chassis 3 with a pivot 79. The first hydraulic ram 55 is associated with the left front wheel 25 and the second fluid actuator 57 is associated with the left rear wheel 27.

The second actuator means 53 is similar to the first actuator means 51 and comprises third and fourth hydraulic rams 83, 85 each having a cylinder 87, 89; a piston 91, 93; and a piston rod 95, 97. The third and fourth hydraulic rams 83, 85 are mounted on the side 7 of the chassis 3 in a generally horizontal, aligned manner. The free ends of their piston rods 95, 97 are pivotally connected with a pivot 99 to the end of an upwardly extending, centrally located, lever 101 on the second walking beam 33. The third and fourth rams 83, 85 are also pivotally connected, via the ends of their cylinders 87, 89 to the side 7 of the chassis with pivots 103, 105 respectively. The third hydraulic ram 83 is associated with the right front wheel 45 and the fourth hydraulic ram 85 is associated with the right rear wheel 47.

A first connection system 111 cross-connects the hydraulic rams 55, 57, 83, 85. In more detail, as shown in FIG. 3, the first connection system 111 has a first hydraulic line 113 connecting the rear chambers 115, 117 in the rams 55, 57 on one side of the vehicle. A second hydraulic line 119 connects the rear chambers 121, 123 in the rams 83, 85 on the other side of the vehicle. A third hydraulic line 125 connects the first and second hydraulic lines 113, 119.

A second connection system 131 also cross-connects the hydraulic rams 55, 57, 83, 85. The second connection system 131 has a first hydraulic line 133 connecting the front chambers 135, 137 in rams 55, 57; a second hydraulic line 139 connecting the front chambers 141, 143 in the rams 83, 85; and a third hydraulic line 145 connecting the first and second hydraulic lines 133, 139.

The first connection system 111 includes an accumulator 151 connected to the line 125 via a line 153. A metering valve 155, along with a free flow bypass valve 157, is located in line 153, as is a safety hand valve 159. Similarly, the second connection system 131 includes an accumulator 161 connected to line 145 via a line 163. A metering valve 165, with a free flow bypass valve 167, is located in line 163 as is a safety hand valve 169.

The suspension system of the vehicle has a second fluid system which is also preferably hydraulic. The second hydraulic system, as shown in FIG. 3, includes a source of hydraulic fluid 171, a pump 173, a control valve 175, and a third connection system 177. The third connection system 177 has a first hydraulic feed line 179 from the source 171 to valve 175 via pump 173, and a second hydraulic return line 181 from valve 175 to the source 171. A third hydraulic line 183 connects valve 175 to connecting line 145 in the second connection system 131. A fourth hydraulic line 185 connects valve 175 to the connecting line 125 in the first connection system 111.

The control valve 175 is an electrically controlled, three-position valve having: an "off" position where no hydraulic fluid is passed through the valve because lines 183 and 185 are blocked; a "forward tilt" position where hydraulic fluid is passed through line 183 and returns through line 185; and a "rearward tilt" position where hydraulic fluid is passed through line 185 and returns through line 183. In the "off" position, there is no connection through the valve between feed line 179 and third or fourth lines 183, 185 and thus no effective connection between the first hydraulic system and the second hydraulic system. In the "forward tilt" position, a solenoid 191 shifts one end 193 of valve 175 to connect feed line 179 to third line 183 and to connect the fourth line 185 to the return line 181. The solenoid 191 is activated by a switch 195 which can also activate the pump 173. In the "rearward tilt" position, a solenoid 199 shifts the other end 201 of the valve 175 to connect the feed line 179 to the fourth line 185 and to connect the third line 183 to the return line 181. A switch 203 activates the solenoid 199 and can also activate the pump 173.

Figure 4:
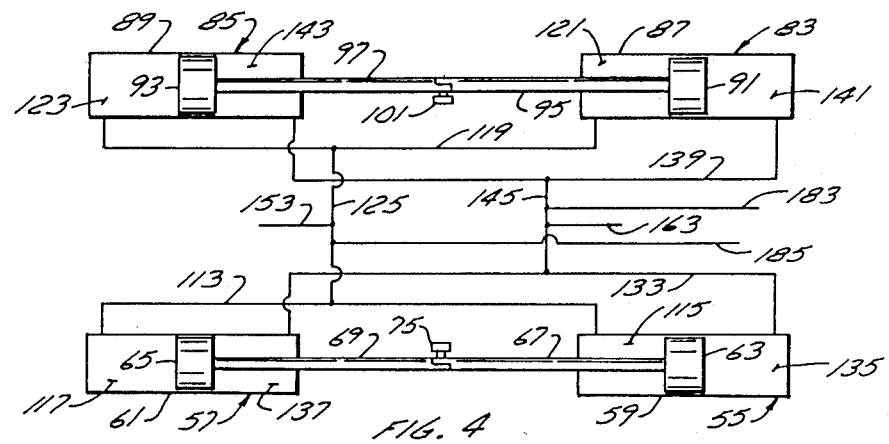
FIG. 4 is a schematic view of the fluid actuators with the vehicle in a normal level position.

Initially, in setting up the improved suspension system in its first operating condition, the hydraulic rams 55, 57, 83, 85 and the first and second hydraulic connecting systems 111, 131, along with the lines 153, 183 and 185 are filled with hydraulic fluid, and the accumulators 151, 161 are precharged in a way to constantly balance the hydraulic fluid volume in the rams on both sides of the vehicle. As shown in FIGS. 3 and 4, the pistons 63, 65 in rams 55, 57 on one side 5 of the vehicle; and the pistons 91, 93 in rams 83, 85 on the other side 7 of the vehicle are generally centrally located in their respective cylinders to maintain the chassis 3 generally level on level ground. With the manner in which the rams 55, 57, 83 and 85 are mounted between the chassis and the walking beams, and interconnected to each other, the chassis 3 is maintained in its generally level set up position and normally returns to this level position if tilted during travel of the vehicle.

Figure 5:
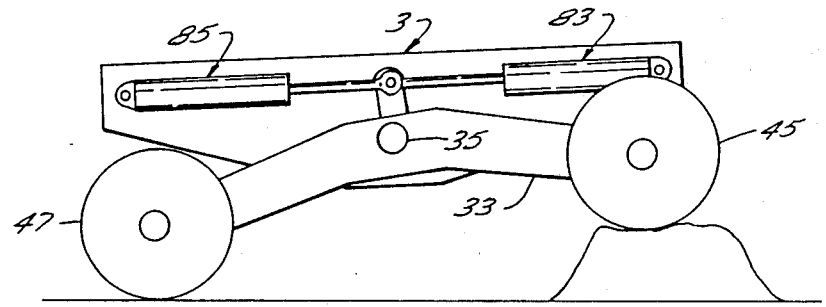
FIG. 5 is a side view of the vehicle in a position where one wheel is raised.
Figure 6:
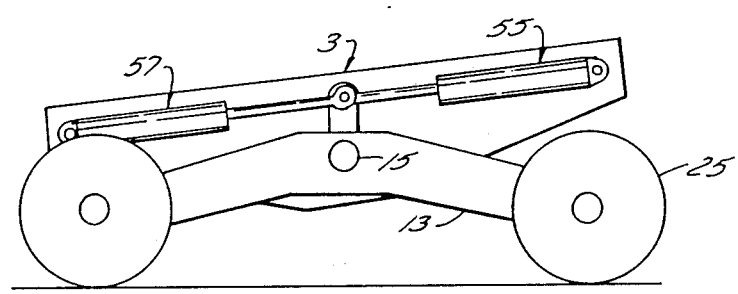
FIG. 6 is an opposite side view of the vehicle in a position where the one wheel is raised.
Figure 7:
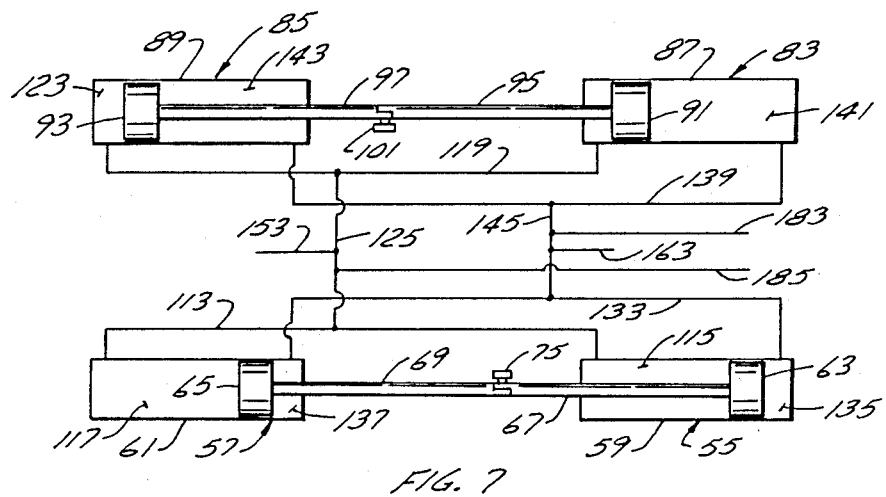
FIG. 7 is a schematic view of the fluid actuators with one wheel of the vehicle raised.

In the first operating condition, the control valve 175 is in the "off" position and the improved suspension system operates automatically to reduce tilting of the vehicle when it hits a bump. When, for example, as shown in FIGS. 5, 6, and 7, the right front wheel 45 hits a bump, the walking beam 33 is raised and also pivots about the pivot 35. As the beam 33 rises, it also lifts pivot 35 and thus chassis 3 causing it to tilt. As the beam 33 also pivots about pivot 35, the fixed lever 101 on beam 33 causes the piston 91 in the ram 83 associated with the right front wheel 45 to move rearwardly. Fluid is driven out of the rear chamber 121 of ram 83, and into the rear chamber 115 of the ram 55 associated with the left front wheel 25. This causes the piston 63 in ram 55 to move forwardly, thus tending to pivot the walking beam 13, via rod 67 and fixed lever 75 about pivot 15 to tend to move the left front wheel 25 downwardly. Effectively, this raises the chassis 3 on the left side so as to minimize tilting and to stabilize the vehicle. As the beam 33 is pivoting, the piston 93 in ram 95, associated with the right rear wheel 47, is also moved rearwardly, driving fluid out of its rear chamber 123 and into the rear chamber 117 of ram 57 associated with the left rear wheel 27. This causes the piston 65 in ram 57 to move forwardly, thus tending to move the left rear wheel 27 upwardly and further help to stabilize the chassis. After the right front wheel 45 passes over the bump, the pistons in all four chambers return to their central neutral position to level the chassis. The accumulators 151, 161 dampen the surge of fluid flow between the rams.

Figure 8:
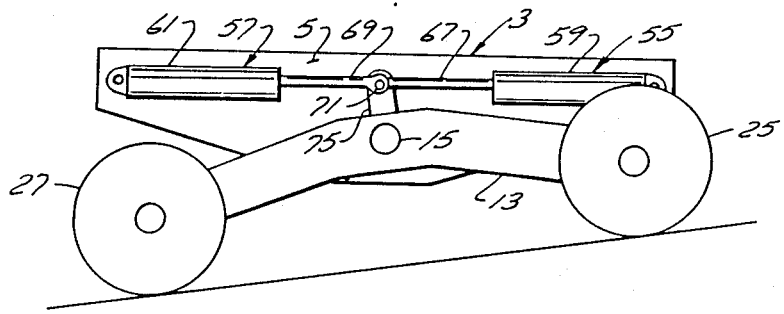
FIG. 8 is a side view of the vehicle on sloping ground with the chassis tilted to a level position.
Figure 9:
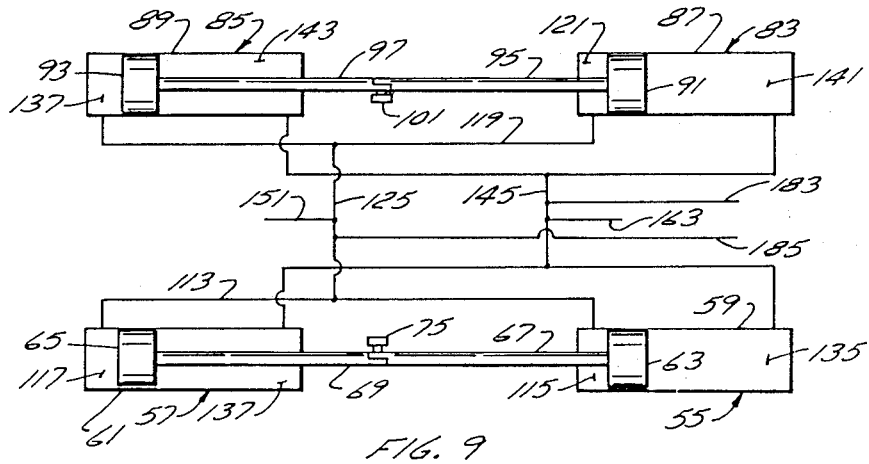
FIG. 9 is a schematic view of the fluid actuators with the vehicle in the position shown in FIG. 8.

The suspension system can be set to a second operating position so as to tilt the chassis to a level position when it is on sloping ground. If, for example, the vehicle 1 is on an upward slope as shown in FIG. 8, the operator can close switch 195 momentarily to cause solenoid 191 to shift one end 193 of the valve 175 to a position where feed line 179 connects with line 183. This connects the second hydraulic system to the first hydraulic system, and more particularly, the third connection system to the second connection system. Pump 173 is also operated to pump fluid through lines 179 and 183 to the front chambers 135, 137, 141, 143 of all four rams 55, 57, 83, 85. This moves the cylinders 59, 61, 87, 89 forwardly tilting the chassis to a level position. The fluid displaced from chambers 115, 117, 121, 123 by movement of the cylinders relative to the pistons 63, 65, 91, 93 returns to the fluid supply 171 via lines 185, 181. Once chassis 3 is level, the switch 195 is turned off and valve 177 moves to a neutral position, locking the rams in place as shown in FIG. 9. Once the vehicle returns to level ground, the operator levels the chassis using switch 203 to move the cylinders 59, 61, 87, 89 back to a neutral, mid-point position relative to the pistons, and then returns the valve 177 to its "off" position.

The improved suspension system provides good damping of vertical chassis movement and more equal load distribution on the wheels since the fluid pressure on the pistons in all four actuators is equal and also since the surface areas of the pistons in all four actuators, on either side of the pistons, balances out. The fluid suspension means also reduces impact loads on the vehicle.

While the improved suspension system employs hydraulic systems, it is contemplated that the system could work with other fluids.

The hydraulic rams are shown to be horizontally positioned when connected between the chassis and the walking beams. This conserves space. However, the hydraulic rams could also be positioned vertically while connected between the chassis and the walking beam. Four single acting rams are shown. They could be replaced with two double acting rams, one on each side of the chassis, or even with a single, single acting ram on each side of the chassis. A vehicle with a single ram on each side would not be quite balanced but could be operable.

The suspension system has been described with the first and second hydraulic systems operating independently. However, both could be operated simultaneously by using a low volume of fluid flow from the pump and a proper flow restriction on the return line. Thus, stabilizing of the vehicle when traveling over bumps on sloping ground can take place simultaneously with leveling the vehicle.

I claim:

1. A vehicle with an improved suspension system consisting of a chassis with a first bogie on one side of the vehicle and a second bogie on the other side of the vehicle; each bogie consisting of a walking beam, pivot means pivotally mounting the walking beam at about its longitudinal center to a side of the chassis at about the longitudinal location of the vehicle's center of gravity, and at least one wheel at each end of the beam; a hydraulic system having actuator means connected between each walking beam and the chassis for generally maintaining the chassis level on level ground; the hydraulic system having first and second connecting systems extending between the two actuator means in a manner to have movement of one wheel in one bogie in one direction when passing over uneven ground simultaneously and automatically tend to move the corresponding wheel in the other bogie in the opposite direction to the one direction to minimize tilting of the chassis and to stabilize the vehicle.

2. A vehicle as claimed in claim 1, wherein each actuator means comprises two hydraulic rams, each ram having a cylinder, a piston slidable in the cylinder, and a piston rod projecting from the piston out of one end of the cylinder; the cylinders generally aligned and horizontal with the piston rods facing each other; one cylinder pivotally connected at its other end to the chassis near the front wheel, the other cylinder pivotally connected at its other end to the chassis near the rear wheel; each projecting piston rod connected to the walking beam.

3. A vehicle as claimed in claim 2, wherein the projecting piston rods of each ram are pivotally connected at the same point to an upwardly extending extension of the walking beam, which point is located above the pivot means.

4. A vehicle as claimed in claim 1, including a second hydraulic system having: valve means, a fluid source, and a third connecting system; the valve means selectively connecting the fluid source to the actuator means via the third connecting system and one of the first and second connecting systems to tilt the chassis relative to the walking beams about the pivot means in one direction or the other so as to maintain the chassis generally level on ground that slopes in the longitudinal direction of the vehicle.

5. A vehicle as claimed in claim 4, wherein each actuator means comprises two hydraulic rams, each ram having a cylinder, a piston slidable in the cylinder, and a piston rod projecting from the piston out of one end of the cylinder; the cylinders generally aligned and horizontal with the piston rods facing each other; one cylinder pivotally connected at its other end to the chassis near the front wheel, the other cylinder pivotally connected at its other end to the chassis near the rear wheel; each projecting piston rod pivotally connected to the walking beam.

6. A vehicle as claimed in claim 5, wherein the first connecting system comprises fluid lines connecting the one end of the cylinder and the other end of the other cylinder rams on one side of the vehicle, to the one end of the one cylinder and the other end of the other cylinder of the rams on the other side of the vehicle; and wherein the second connecting system comprises fluid lines connecting the other end of the one cylinder and the one end of the other cylinder of the rams on one side of the vehicle to the other end of the one cylinder and the one end of the other cylinder of the rams on the other side of the vehicle.

7. A vehicle as claimed in claim 6, wherein the fluid lines in the third connecting system have a line connecting the valve to the fluid lines in the first connecting system, and another line connecting the valve to the fluid lines in the second connecting system.

8. A vehicle as claimed in claim 6, including accumulator means in the fluid lines of the first and second connecting systems for dampening fluid flow in the lines.

9. A vehicle as claimed in claim 1, wherein each actuator means comprises two hydraulic rams positioned generally horizontal on the vehicle and aligned with each other with one end of each ram attached to the walking beam and with the other end of one ram attached to the chassis near the front wheel and the other end of the other ram attached to the chassis near the rear wheel.

10. A vehicle as claimed in claim 9, including a third connecting system having: a fluid source, a pump, fluid lines connecting the fluid source and pump to the first and second connecting systems and a valve in the fluid lines; the valve selectively operable between a position disconnecting the pump from the first and second connecting systems and a position connecting the pump of either of the first and second connecting systems to tilt the chassis about the pivot means in one direction or the other so as to maintain the chassis generally level on ground that slopes in the longitudinal direction of the vehicle.

11. A vehicle with an improved suspension system consisting of a chassis with a first bogie on one side of the vehicle and a second bogie on the other side of the vehicle; each bogie consisting of a walking beam, horizontal pivot means pivotally mounting the walking beam at about its longitudinal center to a side of the chassis at about the longitudinal location of the vehicle's center of gravity and at least one wheel at each end of the beam; a first hydraulic system having actuator means connected between each walking beam and the chassis for generally maintaining the chassis level on level ground; a second hydraulic system selectively connected to the first hydraulic system to cause the actuators to tilt the chassis relative to the walking beams on sloping ground; and valve means for selectively operating the actuator means in a first mode of operation to minimize tilting of the chassis when the vehicle travels over rough ground or in a second mode of operation to level the chassis when the vehicle is on sloping ground with its longitudinal axis generally aligned with the direction of slope.

* * * * *